(12) United States Patent
Town et al.

(10) Patent No.: US 9,117,487 B2
(45) Date of Patent: Aug. 25, 2015

(54) METHOD AND SYSTEM FOR DISC AUTHENTICATION AND SECURITY

(71) Applicant: THOMSON LICENSING, Issy de Moulineaux (FR)

(72) Inventors: John Matthew Town, Ojai, CA (US); Holger Hofmann, Ingelheim (DE); Alan Bruce Hamersley, Newbury Park, CA (US)

(73) Assignee: Thomson Licensing, Issy les Moulineaux (FR)

(*) Notice: Subject to any disclaimer, the term of this patent is extended or adjusted under 35 U.S.C. 154(b) by 0 days.

(21) Appl. No.: 14/344,598

(22) PCT Filed: Sep. 21, 2012

(86) PCT No.: PCT/US2012/056587
§ 371 (c)(1),
(2) Date: Mar. 12, 2014

(87) PCT Pub. No.: WO2013/044037
PCT Pub. Date: Mar. 28, 2013

(65) Prior Publication Data
US 2014/0347968 A1 Nov. 27, 2014

Related U.S. Application Data

(60) Provisional application No. 61/538,790, filed on Sep. 23, 2011.

(51) Int. Cl.
*G11B 19/04* (2006.01)
*G11B 20/18* (2006.01)
(Continued)

(52) U.S. Cl.
CPC ............ *G11B 20/12* (2013.01); *G11B 7/00745* (2013.01); *G11B 7/26* (2013.01); *G11B 20/00123* (2013.01); *G11B 20/00601* (2013.01); *G11B 20/00268* (2013.01); *G11B 20/00275* (2013.01); *G11B 20/00876* (2013.01); *G11B 2020/1285* (2013.01);
(Continued)

(58) Field of Classification Search
CPC ...... G11B 7/126; G11B 7/1267; G11B 19/12; G11B 2007/0006; G11B 2007/0013; G11B 7/24
USPC ........ 369/47.51, 47.52, 47.53, 116, 120, 121, 369/94, 53.22, 53.14, 53.15, 53.18
See application file for complete search history.

(56) References Cited

U.S. PATENT DOCUMENTS 5,844,676 A * 12/1998 Southam et al. ............ 356/237.1
8,199,627 B2 * 6/2012 Ogata ............................ 369/94
(Continued)

FOREIGN PATENT DOCUMENTS

EP          0807929       11/1997
WO     WO2007076418       7/2007
WO     WO2007113040      10/2007

*Primary Examiner* — Nabil Hindi
(74) *Attorney, Agent, or Firm* — Robert D. Shedd; Lily Neff

(57) ABSTRACT

A method and apparatus for disc authentication are disclosed. The authentication method includes measuring at least one physical property of a data disc, which includes at least one of an angle and an eccentricity parameter associated with two data layers of a data disc, and authenticating the disc by determining whether a match exists between the measured property and encoded information on data layer the data disc relating to the physical property.

13 Claims, 3 Drawing Sheets

(51) Int. Cl.
*G11B 20/12* (2006.01)
*G11B 20/00* (2006.01)
*G11B 7/007* (2006.01)
*G11B 7/26* (2006.01)

(52) U.S. Cl.
CPC .. *G11B 2220/235* (2013.01); *G11B 2220/2537* (2013.01); *G11B 2220/63* (2013.01)

(56) References Cited

U.S. PATENT DOCUMENTS

2005/0057837 A1\* 3/2005 Takamatsu et al. ............. 360/48
2005/0220303 A1\* 10/2005 Mizushima et al. .......... 380/201

\* cited by examiner

METHOD AND SYSTEM FOR DISC AUTHENTICATION AND SECURITY

CROSS-REFERENCES TO OTHER APPLICATIONS

This application claims the benefit, under 35 U.S.C. §365 of International Application PCT/US2012/056587 filed Sep. 21, 2012 which was published in accordance with PCT Article 21(2) on Mar. 28, 2013 in English, and which claims the benefit of U.S. provisional patent application No. 61/538,790 filed Sep. 23, 2011.

TECHNICAL FIELD

This invention relates to a method and system for disc authentication and security.

BACKGROUND

There are many different approaches for authenticating optical data discs that are produced or manufactured with pre-recorded content. For example, existing standards for DVD (digital versatile discs) and BD (blu-ray discs) provide for unique data or serializing these discs via BCA coding. Another method, Postscribed ID™, inscribes unique ID data to a disc by modifying the area between pits on the disc surface after the stamping process. Other methods for authentication or preventing unauthorized duplication have been discussed by Carson, e.g., U.S. Pat. No. 7,568,081 "Authenticating a Data Storage Medium using Predetermined Intersector Relationships", and U.S. Pat. No. 6,477,124 "Varying the Rate at which Data Appear on an Optical Disc Rotated at a Constant Linear Velocity to Prevent Unauthorized Duplication of the Disc", respectively, subject matter of which is herein incorporated by reference in their entirety. However, there is still an ongoing need for alternative and improved methods of disc authentication.

SUMMARY OF THE INVENTION

Embodiments of the present invention provide a data disc having encoded information for use in disc authentication, a method for forming the disc, a method of disc authentication and an apparatus for disc authentication. One or more angle and eccentricity parameters associated with two data layers in a DVD or BD are used for disc authentication purpose. For example, information relating to at least an angle and/or eccentricity parameter associated with two data layers in a DVD or BD can be encoded on the disc, e.g., in a burst cutting area code or a RFID chip bonded to the disc. To authenticate a disc, a disc player has to detect and identify at least one of the angle and/or eccentricity associated with the two data layers or two sectors in the data layers. If the information matches the encoded information in the BCA code, the disc is an authentic disc.

One embodiment provides a data disc, which includes a first data layer and a second data layer characterized by at least one of an angle and an eccentricity parameter; and encoded information relating to at least one of the angle and the eccentricity parameter.

Another embodiment provides a method for forming a data disc, which includes forming a first data layer and a second data layer on at least one substrate; the first and second data layers characterized by at least one of: an angle and an eccentricity parameter; and providing encoded information on the data disc relating to at least one of: the angle and the eccentricity parameter.

Yet another embodiment provides a method of disc authentication, which includes providing a data disc having a first data layer and a second data layer and encoded information relating to at least one of: an angle and an eccentricity parameter associated with the first and second data layers; measuring at least one of the angle and the eccentricity parameter; authenticating the data disc by comparing at least one of the measured angle and the measured eccentricity parameter with the encoded information.

Yet another embodiment provides an apparatus for disc authentication, which includes a disc reader configured for measuring at least one of: an angle and an eccentricity parameter associated with a first data layer and a second data layer of a data disc; and a processor configured for determining whether the at least one of the measured angle and the eccentricity parameter matches encoded information on the data disc, wherein the encoded information relates to at least one of the angle and the eccentricity parameter.

BRIEF DESCRIPTION OF THE DRAWINGS

The teachings of the present invention can be readily understood by considering the following detailed description in conjunction with the accompanying drawings, in which.

DETAILED DESCRIPTION

For data discs such as blu-ray discs (BD), digital video or versatile discs (DVD) and compact discs (CD) that are manufactured with pre-recorded content, each disc for the same title has inherently identical data because each disc is a molded replica from the same master or stamper. Dual-layer DVD and BD discs feature two data layers (e.g., DVD with both data layers being molded on separate substrates, and BD with one data layer being molded on a single substrate and the other one being embossed) that are stacked in the vertical plane. While the data layers or the associated data for a particular disc title do not differ from disc to disc, one or more angles associated with the two data layers (e.g., a relative angle defined between one sector in a first data layer and another sector in a second data layer; or an orientation or bonding angle representing the relative orientation between the two data layers) as well as eccentricity parameters of one layer to the other are effectively unique for each disc, as determined by the manufacturing and bonding process. If the various angles and eccentricity parameters can be identified or determined for individual discs, they can be used as identifiers for distinguishing among otherwise identical discs.

The disc manufacturing process involves an unsynchronized spinning operation in which a disc (e.g., a half disc for DVD, or a BD substrate prior to the formation of a second data layer) that is registered perfectly to a mold orientation become randomly disoriented, as governed by the behavior of the servo spin motor and the angular orientation at which the disc comes to rest, prior to the bonding or embossing step that adds the second data layer. As the two data layers are permanently fixed or bonded relative to each other (i.e., by bonding the two half-discs or substrates for DVD containing the two data layers, or forming the second data layer on a BD substrate), various angles associate with the layers and the eccentricity, in terms of magnitude and angle, of one layer to the other layer and relative to the center hole of the disc (e.g., center hole of the L0 substrate) are unique properties that can be used for authentication purposes. Some of these parameters are discussed in conjunction with FIGS. 1-2. In the present discussion, forming a data layer on a substrate also includes situations in which the data layer is formed on an intermediate layer supported by the substrate.

Figure 1A:
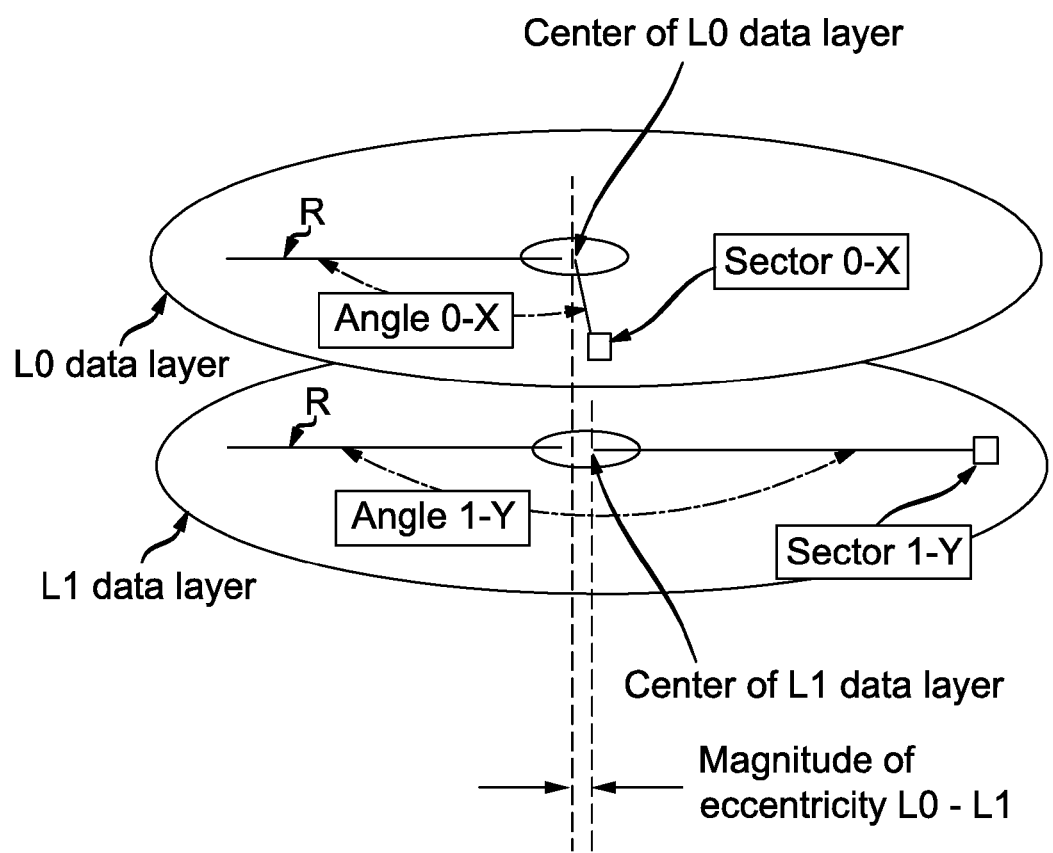
FIG. 1A illustrates two data layers of a data disc with parameters for use in disc authentication according to embodiments of the present invention.

FIG. 1A is a schematic diagram of a dual-layer data disc illustrating a relative angle that can be defined between sectors of two data layers L0 and L1, and eccentricity of the first data layer L0 relative to the second data layer L1. Sector 0-X and Sector 1-Y are two discrete sectors, one from each layer, which are predetermined, known or selected in advance for use in disc authentication. Sector 0-X and Sector 1-Y can also be referred to as a sector pair. Angle 0-X and Angle 1-Y (may also be referred to as sector angles) are discrete rotation angles of these sectors relative to a reference point of the dual-layer disc. For example, the rotation angle of a sector can be defined for a line joining the center of the data layer to a reference location of that sector, which can be a sector boundary or another pre-defined point within that sector. The reference point for the dual-layer disc (shown as R in FIG. 1A) is an arbitrary reference that can be generated, for example, by a once per revolution pulse or self-generated by a disc drive or player via PLL (phase locked loop).

Eccentricity L0-L1 is the eccentricity of the L1 disc layer relative to the L9 disc layer. In FIG. 1A, only the magnitude of this eccentricity is shown, i.e., the offset or physical distance between the centers of data layers L0 and L1. The angle of the eccentricity, which is another parameter that can be used as a disc identifier, needs to be referenced to a fixed sector (e.g., a sector boundary or a reference point in the sector) on L0 or L1, or to another reference angle, not the once per revolution pulse. This angle of eccentricity is further discussed below in reference to FIG. 2.

The relative angle of the L0 and L1 data layers (given by the difference between Angle 0-X and Angle 1-Y), and the eccentricity L0-L1 are essentially unique physical properties of a disc, and cannot be readily re-created on a disc-by-disc basis. Therefore, these parameters, either individually or in combination, can be used as a security measure for authenticating the disc.

Another angle, representing the fixed relative orientation of two data layers in a dual-layer or multi-layer disc, can also be used for disc authentication. This relative orientation of the two data layers can be defined based on two predetermined reference locations on the L0 and L1 layers (or half-discs for DVD) respectively.

Figure 1B:
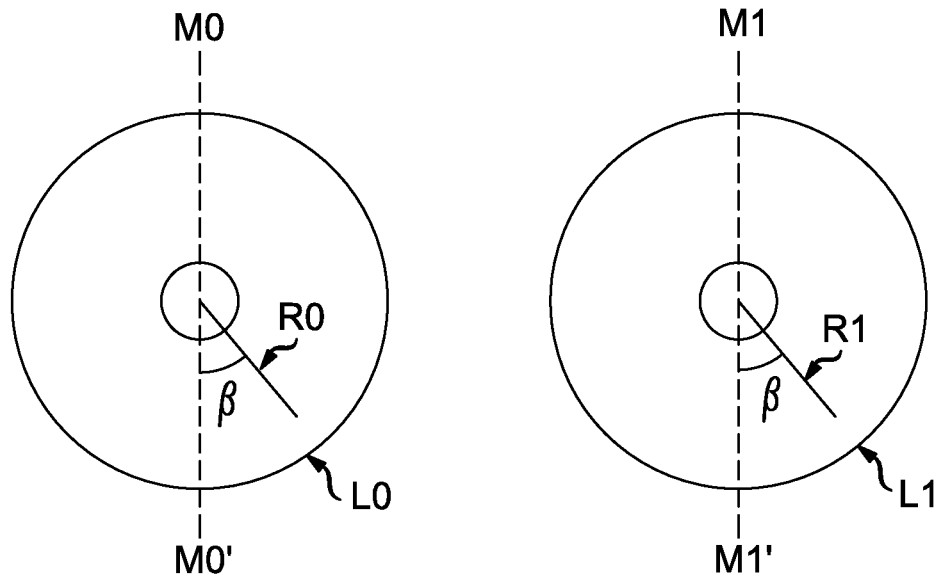
FIG. 1B-C illustrates another parameter associated with two data layers that can be used for disc authentication.

This is illustrated in FIG. 1B, which shows a reference line or feature R0 on the L0 layer and a reference line or feature R1 on the L1 layer selected prior to bonding of the two DVD half-discs or formation of the L1 data layer on a BD. In this example, both reference lines R0 and R1 have the same orientation or angular relationship (e.g., angle $\beta$) relative to their respective "mold orientation reference" (i.e., a fixed relationship for the data layer relative to the mold for the substrate). The line M0-M0' is the mold orientation reference for the L0 layer, and M1-M1' is the mold orientation reference for the L1 layer. The angle between R0 and R1 is zero in this illustration.

Figure 1C:
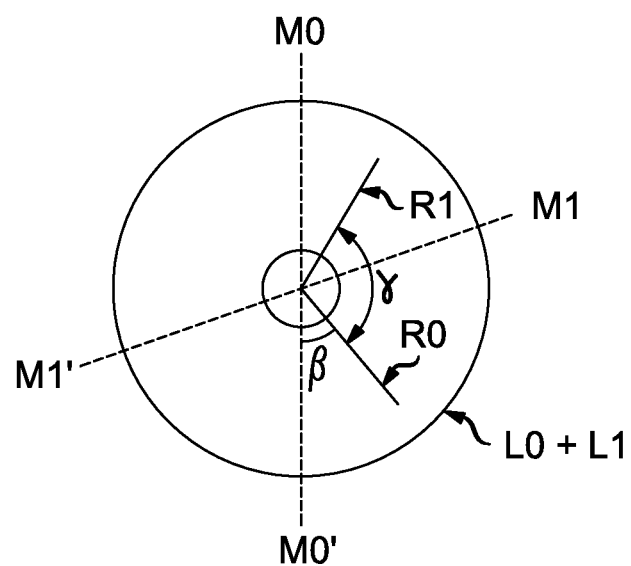

After the L1 and L1 data layers are permanently fixed during manufacturing (e.g., bonding of the two half-discs for a DVD or formation of the L1 layer for the BD), the relative orientation of the R0 and R1 reference lines will usually change with respect to each other (due to the unsynchronized spinning and/or bonding operation), as shown in FIG. 1C. The angle between R0 and R1 is now given by a fixed angle $\gamma$, which corresponds to a fixed angle representing the orientation between the L0 and L1 layers. This angle may also be referred to as an orientation or bonding angle. Measurement of this bonding angle can be performed using a camera system to detect an inner graphics band feature or other suitable reference and measuring an angular displacement of the feature or reference between the L0 and L1 layers.

Figure 2:
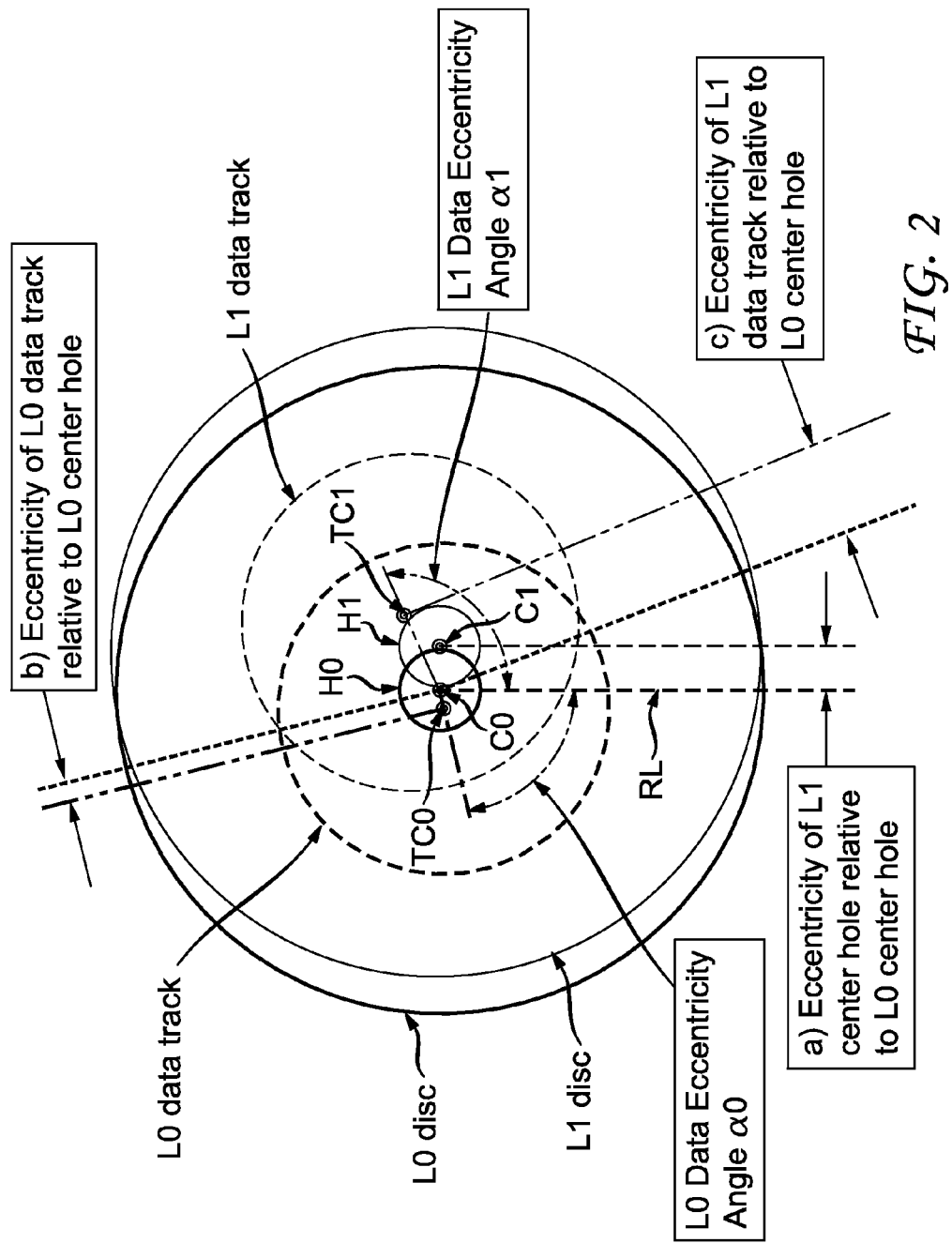
FIG. 2 is a plan view of two data layers of a data disc showing additional parameters for use in disc authentication according to embodiments of the present invention.

Some eccentricity parameters are illustrated in FIG. 2, which shows a plan view of the L0 and L1 discs or substrates (large solid circles), with representative data tracks L0 and L1 (dashed circles), and inner or center holes H0 and H1 (small solid circles) for the L0 and L1 substrates, respectively. C0 and C1 represent the centers for the respective L0 and L1 substrates, which are also the centers of holes H0 and H1. In general, the L0 and L1 substrates are slightly offset with respect to each other because of imperfect alignment during the bonding of the substrates. Each of the L0 and L1 data tracks or layers is also not concentric relative to the respective centers (or center holes) of the L0 and L1 substrates. Therefore, the centers for the L0 and L1 data layers or tracks, TC0 and TC1, do not coincide with disc or substrate centers C0 and C1.

Various parameters associated with the eccentricities for the L0 and L1 substrates and their respective data layers or tracks are shown in FIG. 2, including the magnitudes of:
a) eccentricity of the L1 center hole with respect to the L0 center hole, represented by an offset between C1 and C0;
b) eccentricity of the L0 data track to the L0 center hole, represented by an offset between TC0 and C0; and
c) eccentricity of L1 data track to the L0 center hole, represented by an offset between TC1 and C1.

The magnitude of the eccentricity between the L1 and L1 data layers or tracks (which is shown in FIG. 1A) is given by the offset or distance between TC1 and TC0.

The eccentricity angle between the L1 and L0 data layers are given by a difference between angles $\alpha 0$ and $\alpha 1$ (this difference may sometimes be referred to as a relative eccentricity angle), where $\alpha 0$ and $\alpha 1$ are the eccentricity angles for the respective L0 and L1 data layers with axis of rotation during playback of the disc registered to the center hole of the L0 disc, and defined relative to a predetermined sector boundary on one of the first data layer or the second data layer. As shown in FIG. 2, $\alpha 0$ is the angle between the line joining the centers of the L0 data track and the L0 disc (i.e., line joining TC0 and C0) and an arbitrary reference line RL passing through C0. $\alpha 1$ is the angle between the line joining the centers of the L1 data track and the L0 disc (i.e., line joining TC1 and C0) and the same reference line RL. In practice, the reference line RL can be a predetermined sector location (e.g., sector boundary or a reference point in the sector) in the L0 data layer or L1 data layer, or certain inner graphics band item or feature if detection of the rotation angle is to be done by a camera. For measurement of the relative eccentricity angle (i.e., difference between $\alpha 0$ and $\alpha 1$), the reference can also be an external one, e.g., generated using a once per revolution pulse or PLL.

Furthermore, angles $\alpha 0$ and $\alpha 1$ can be used to define additional parameters for the L0 layer and the L1 layer, respectively. For example, an eccentricity angle for the L0 layer can be defined as a difference between angle $\alpha 0$ and a given (known or predetermined) sector boundary angle for a sector on the L0 layer. Another eccentricity angle can be defined for the L1 layer as a difference between angle α1 and a given (known or predetermined) sector boundary angle for a sector on L0 or L1 layer.

The measurement of eccentricity angles using an optical drive for detecting sector locations is known to one skilled in the art. However, if a camera is used for measurements, then it is necessary to first measure a sector boundary angle compared to an inner graphics band in an optical drive, and then use this angle to compute the angle difference between sector boundary and eccentricity angle during camera measurement.

During the manufacturing process, the various angles and eccentricity parameters associated with the two layers can be determined by a DVD/BD disc reader, an inline scanner-like camera system or other similar devices suitable for such measurements. Information about the relative angle, bonding or orientation angle and/or eccentricity parameters can then be encoded in a BCA code on the disc or a RFID (radio-frequency identification) chip bonded to the disc. While the BCA data may be copied or counterfeited, it is virtually impossible to control the relative or bonding angle and eccentricity parameters between two layers of a disc, which makes these parameters (or identifiers based on or derived from these parameters) well-suited for authentication purposes. Furthermore, information regarding which sectors in the L0 and L1 layers are used for defining the relative angle should also be provided as part of the BCA data, or otherwise made known or available to disc drives or readers that will perform disc authentication.

In a disc authentication system, which may be a computer controlled optical drive system, a host application can request a disc drive or player to provide information relating to these parameters, for example, based on measurements performed on the disc. A counterfeit disc will result in an information mismatch between the measured parameters and the encoded information in the BCA data.

Although there are existing methods such as Postscribed ID™ or the BCA coding that provide unique disc identifiers, these methods differ from the present invention because they do not link any unique physical property of the disc to the data encoded in the BCA.

This invention relies on a DVD and BD player being able to detect and identify one or more angles and/or the eccentricity parameters associated with the two data layers, and comparing one or more of these parameters against the encoded information in the BCA. For example, a microprocessor or digital signal processor in the DVD or BD player can perform a timing measurement between events defined as the detection of predetermined sector positions. From the timing data and other information known to the processor, such as data rate or disc spin speed, angles and eccentricity can be calculated. At the disc manufacturing stage, the relative/bonding angle and eccentricity can be detected by a disc reader or drive, or another device like a camera-based system. At the application stage (e.g., vendors, stores, consumer premises, and so on), the DVD/BD players available at these facilities need to be able to measure these properties, with a digital signal processing unit for reading the BCA code, and a microprocessor for comparing the measured results with the BCA content.

Data regarding the physical sectors (e.g., boundaries or other reference points for the sectors) at which angular positions are to be measured can be provided on the DVD/BD, e.g., as part of the BCA of each disc, or otherwise made known or available to a party or device performing the authentication. Although the same predetermined sectors can be used for authentication of every disc title, it is preferable to use different sector pairs for different titles for added security.

Most readers spin discs in constant angular velocity (CAV) and are able to generate or have access to a once-per-revolution pulse from the drive spindle. Read times relative to this pulse can be used to calculate angles of the physical sector boundaries. If the angle of the once-per-revolution pulse is maintained as the reader jumps from one data layer to the other, angles for known sectors can be determined from each layer and a relative angle calculated for the two sectors (e.g., 0-X and 1-Y in FIG. 1) in the corresponding data layers. In other words, for a CAV DVD or BD in track jump mode, the time delay can be used to provide information related to corresponding sector locations. This scheme also works for players using CLV mode (i.e., constant linear velocity, where the spin speed changes with radius) when the changing spin frequencies are taken into account.

For eccentricity measurements, the angular resolution to determine the eccentricity parameters with sufficient accuracy needs to be quite high and may be limited in a practical application on the drive side, e.g., to about 1 degree range, while it maybe easier to achieve at the manufacturing stage, which may have about 10 times better resolution, e.g., about 0.1 degree.

A potential drawback with the authentication scheme of the present invention is that it is possible for some data discs to have the same identifier associated with their measured angles and/or eccentricities combination. This may arise due to limited accuracy of the equipment used for measuring angles and/or eccentricities. For example, assume that an angle, may be determined with an accuracy that can distinguish among 100 different angles, and the eccentricity measurement allows for distinction among 10 different distances and 10 different angles. This yields 100×10×10=10,000 possible values for an identifier associated with the angle/eccentricity combination. Then, even in manufacturing runs of less than 10,000 units, it is possible that some discs will share the same identifier. However, this should not pose a serious limitation for purpose of authentication, since it is basically impossible to produce a disc with a targeted or predetermined combination of bonding angle and eccentricity.

As previously mentioned, the eccentricity relative to the disc's center hole (e.g., center hole for the L0 substrate) is another unique parameter that can be used for authentication purpose. However, the uncertainty of the disc clamping mechanism needs to be taken into account and, depending on the specific equipment, may limit the usefulness of this property for disc authentication. Furthermore, if the clamping uncertainty is on the same order of magnitude as the data track eccentricity relative to the disc's actual center hole (i.e., L0 substrate's center hole), it may not be possible to determine the relative eccentricity angle of both layers in open-track mode by observing the tracking error signal crossings. Since the specification limit of the track eccentricity relative to the disc's center hole is about 50 micron for DVD and 37.5 micron for BD, clamping mechanisms with improved accuracy than those of existing ones may be needed for reliable measurements of the eccentricity parameters.

As with most security measures, disc authentication based on the bonding angle and/or eccentricity parameters (or other identifiers derived from these properties) can be implemented with varying degrees of security. An authentication scheme that uses the bonding angle as the only disc identifier is more vulnerable to tampering by a counterfeiting party, since the relative and/or bonding angles are relatively easy to observe and measure. For example, if the counterfeiting party realizes that encoding of the relative and/or bonding angles in the BCA code is used for authentication, then during manufacturing of the counterfeit discs, the relative and/or bonding angles of each disc can be determined and coded into the BCA for the counterfeit discs.

Furthermore, if only a relative angle, bonding angle or eccentricity parameter is used, i.e., only a single number or identifier, a hacked drive firmware can be configured to report a number matching the information in the BCA code relating to the angle and/or eccentricity of the disc. Here the BCA code will need to be copied from a sample pirated disc.

The hacked firmware can also be configured to simply report a match between the measured angle and the information from the BCA code, even if there is actually no encoded angle information on the counterfeit disc.

To guard against these potential ploys from counterfeiters, one can use a more secured scheme, e.g., one that involves measuring more angle pairs, and requiring a more complex response from the disc drive to the host. For example, several angle pairs, with each pair consisting of or corresponding to angles referenced to different sector boundaries on each of L0 and L1 can be used for authentication purpose. In other words, several sector pairs (e.g., 0-X and 1-Y in FIG. 1, defining respective angle pairs and relative angles) can be selected in advance for use in disc authentication, with each sector pair consisting of a first sector in the first data layer and a second sector in the second data layer. Identifiers representing the measured angles can be established using predetermined functions known or available to the disc players or readers. The host will then compute the required BCA content based on the multi-angle response, possibly in a cryptographic function making it harder for a hacked firmware to spoof the correct response to the bonding angle challenge.

Despite potential limitations described above, disc authentication based on the present principles can still provide an effective barrier against counterfeiting pre-recorded discs. Since the relative or bonding angle between two data layers is effectively unique or pseudo-random, as dictated by the manufacturing/bonding process, it is expected that the number of combinations of unique relative or bonding angles and/or eccentricities (taking into account of the limited angle resolution of a disc player or reader) can still enable an anti-counterfeiting technique based on data matching between the encoded BCA information and the measured physical layer-to-layer (bonding) angle, or relative angles for known sector pairs, and/or eccentricity parameters.

While the same drive can be used for determining the angle (e.g., relative angle between sectors in the two data layers) and/or eccentricity parameters for pre-recorded and recordable discs, it cannot write the BCA code on the recordable discs, which typically would already have a BCA code. Similarly, the recordable disc manufacturing process also includes servo spin processes and it would be practically impossible to control the bonding or orientation angle by synchronizing or aligning the two layers prior to bonding.

Thus, the present principles can be implemented for authentication of both pre-recorded and recordable discs based on information relating to the relative or bonding angle and/or eccentricity, which can be securely challenged by a host application for both the BCA and the data layers of the disc. Embodiments of the present invention provide a data disc having encoded information for authentication purpose, a method of forming such a data disc, a method for disc authentication, as well as an apparatus or system for disc authentication according to the present principles. The apparatus may include a disc reader or player configured to perform authentication by measuring one or more physical properties or parameters of the data disc, and determining whether the measured parameters match the encoded information provided on the disc. Although the examples and discussions above have focused on measuring angles and/or eccentricity parameters for a dual-layer disc, the present principles can be applied or adapted to a multi-layer disc (i.e., having at least two data layers) for which the measured angles and/or eccentricity parameters between any two data layers can be used for disc authentication.

While the foregoing is directed to various embodiments of the present invention, other embodiments of the invention may be devised without departing from the basic scope thereof. For example, one or more features described in the examples above can be modified, omitted and/or used in different combinations. Thus, the appropriate scope of the invention is to be determined according to the claims that follow.

The invention claimed is:

1. A machine-readable non-transitory data disc, comprising:
   a first data layer and a second data layer characterized by an eccentricity parameter; and
   encoded information relating to the eccentricity parameter, wherein the encoded information is for use in authenticating the data disc so that the data disc is authenticated when measured information relating to the eccentricity parameter matches the encoded information.

2. The data disc of claim 1, wherein the eccentricity parameter includes at least one of an eccentricity magnitude and an eccentricity angle.

3. The data disc of claim 1, wherein the eccentricity parameter is defined for at least one of: the first data layer relative to the second data layer, the first data layer relative to a center of a first substrate containing the first data layer, and the second data layer relative to the center of the first substrate.

4. A machine-readable non-transitory data disc, comprising:
   a first data layer and a second data layer characterized by an eccentricity parameter; and
   encoded information relating to the eccentricity parameter, wherein the eccentricity parameter is defined for at least one of: the first data layer relative to the second data layer, the first data layer relative to a center of a first substrate containing the first data layer, and the second data layer relative to the center of the first substrate; and
   the eccentricity parameter of the first data layer relative to the second data layer includes a magnitude given by an offset between respective centers of the first and second data layers, and an eccentricity angle defined as a difference between a first angle associated with the first data layer and a second angle associated with the second data layer, wherein the first angle and the second angle are both defined relative to one of: a once per revolution pulse, a phase-locked loop, or a predetermined sector boundary on one of the first data layer or the second data layer.

5. The data disc of claim 1, wherein the encoded information includes at least one identifier computed from a function relating to the eccentricity parameter.

6. The data disc of claim 1, wherein the encoded information is provided in at least one of a burst cutting area and a radio-frequency identification chip for the data disc.

7. A method for forming a machine-readable non-transitory data disc, comprising:
   forming a first data layer and a second data layer on at least one substrate;
   the first and second data layers characterized by an eccentricity parameter; and providing encoded information on the data disc relating to the eccentricity parameter;
wherein the encoded information is for use in authenticating the data disc so that the data disc is authenticated when measured information relating to the eccentricity parameter matches the encoded information.

8. A method of disc authentication, comprising:
providing a machine-readable non-transitory data disc having a first data layer and a second data layer and encoded information relating to an eccentricity parameter;
measuring the eccentricity parameter;
authenticating the data disc by comparing the measured eccentricity parameter with the encoded information so that the data disc is authenticated when the encoded information matches measured information relating to the measured eccentricity parameter.

9. The method of claim 8, wherein the eccentricity parameter includes at least one of an eccentricity magnitude and an eccentricity angle; wherein the eccentricity angle is defined for at least one of the first data layer and the second data layer.

10. The method of claim 8 wherein the eccentricity parameter is defined for at least one of: the first data layer relative to the second data layer, the first data layer relative to a center of the at least one substrate, and the second data layer relative to the center of the at least one substrate.

11. A method of disc authentication, comprising:
providing a machine-readable non-transitory data disc having a first data layer and a second data layer and encoded information relating to an eccentricity parameter associated with the first and second data layers;
measuring the eccentricity parameter;
authenticating the data disc by comparing the measured eccentricity parameter with the encoded information wherein the eccentricity parameter is defined for at least one of: the first data layer relative to the second data layer, the first data layer relative to a center of the at least one substrate, and the second data layer relative to the center of the at least one substrate; and the eccentricity parameter of the first data layer relative to the second data layers includes a magnitude given by an offset between respective centers of the first and second data layers, and an eccentricity angle defined as a difference between a first angle associated with the first data layer and a second angle associated with the second data layer, wherein the first angle and the second angle are both defined relative to one of: a once per revolution pulse, a phase-locked loop, or a predetermined sector boundary on one of the first data layer or the second data layer.

12. The method of claim 8, wherein the encoded information includes at least one identifier computed from a function relating to the eccentricity parameter.

13. An apparatus, comprising:
a disc reader configured for measuring an eccentricity parameter-associated with a machine-readable non-transitory data disc; and
a processor configured for determining whether the eccentricity parameter matches encoded information on the machine-readable non-transitory data disc, wherein the encoded information is for use in authenticating the data disc so that the data disc is authenticated when measured information relating to the eccentricity parameter matches the encoded information.

\* \* \* \* \*